United States Patent Office 2,996,652
Patented Aug. 15, 1961

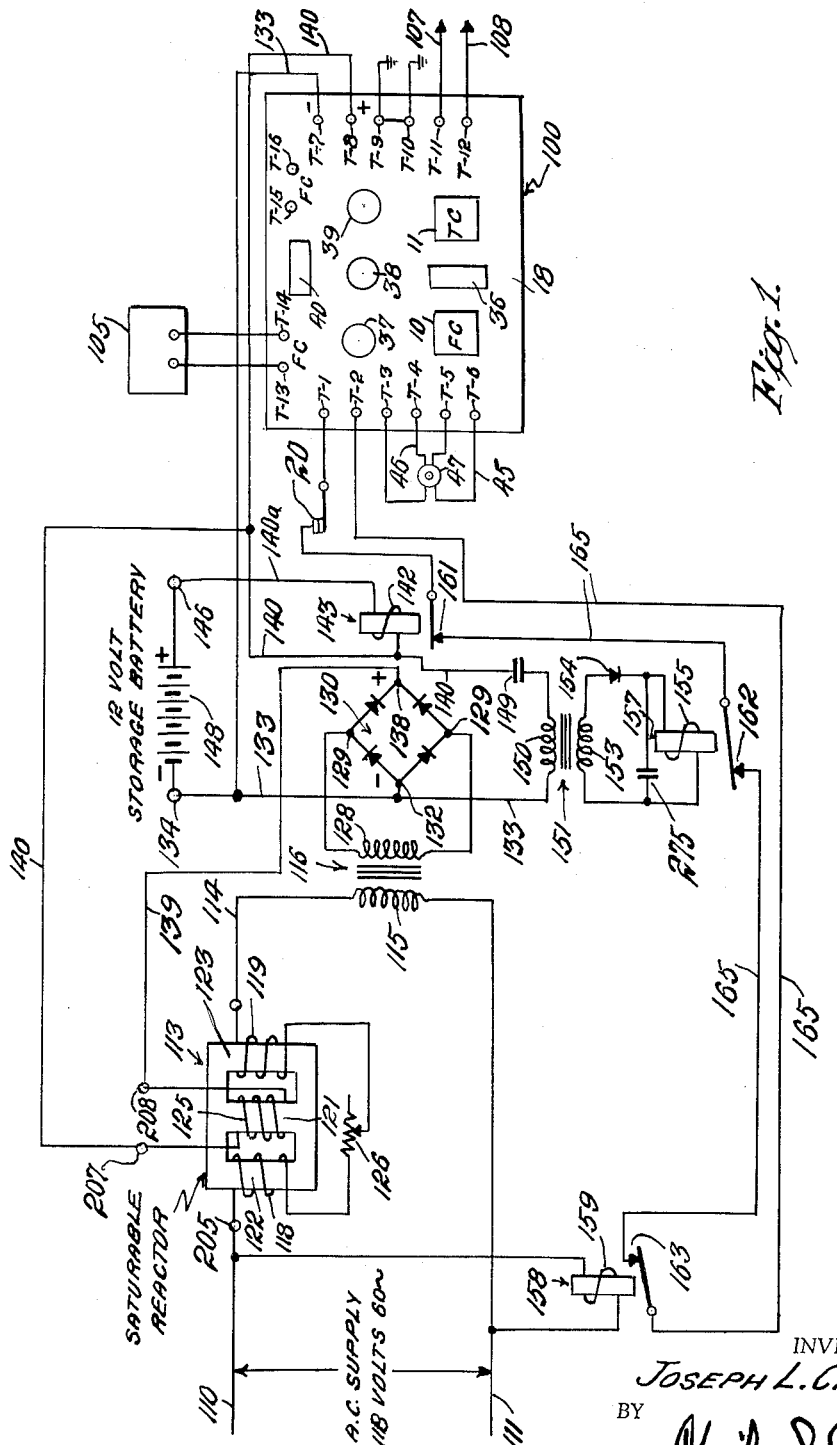

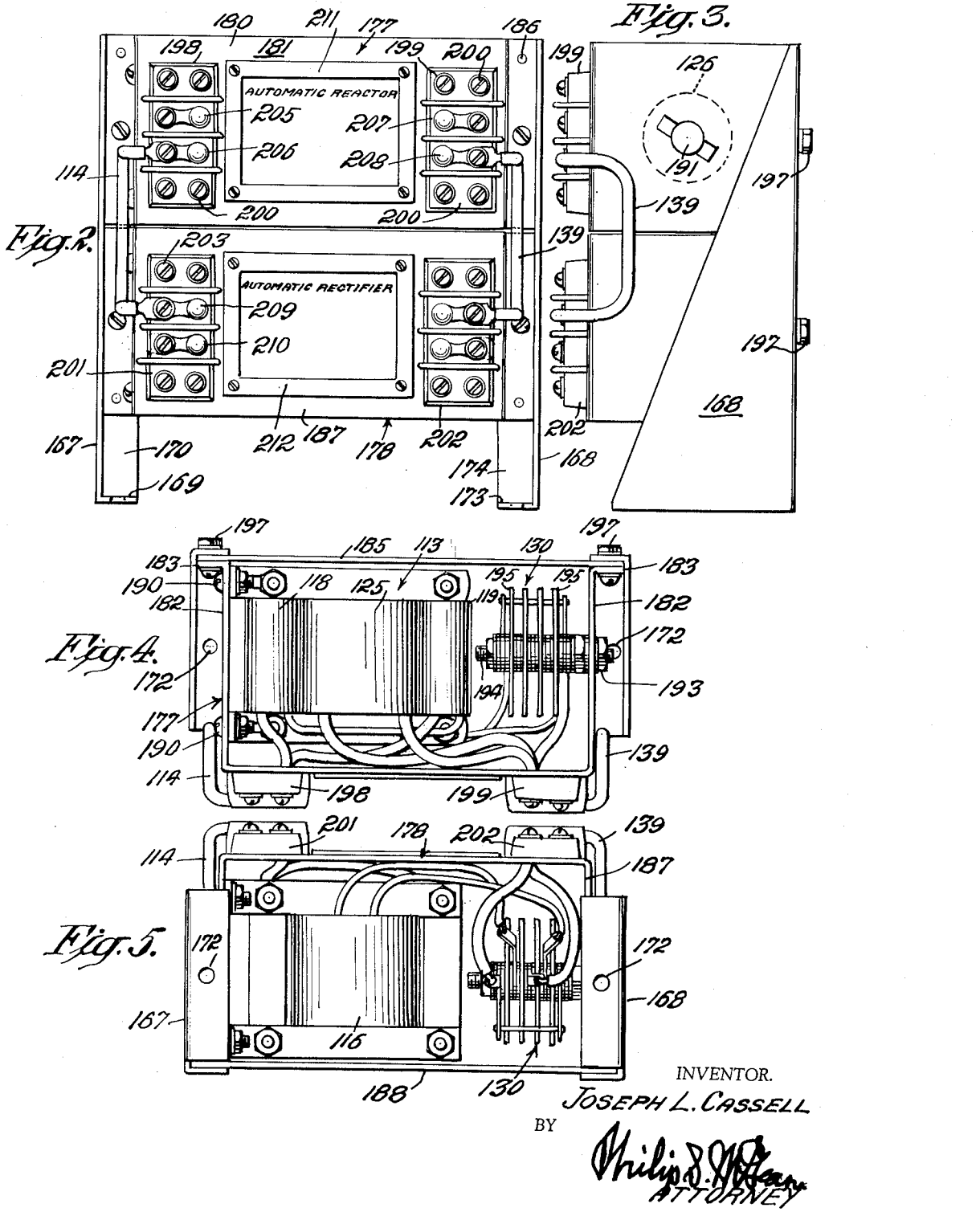

2,996,652
BATTERY CHARGING AND SUPERVISORY APPARATUS FOR CLOSED CIRCUIT ALARM SYSTEMS
Joseph L. Cassell, New York, N.Y., assignor to Automatic Fire Alarm Company, New York, N.Y., a corporation of New York
Filed Nov. 21, 1956, Ser. No. 623,621
10 Claims. (Cl. 320—48)

The present invention relates to charging circuits and apparatus for lead-acid, nickel-cadmium, or other storage batteries used in connection with closed circuit alarm systems.

This application is a continuation in part of copending application Serial No. 456,033, filed on September 14, 1954, now Patent Number 2,938,197, for "Automatic Alarm Transmitter."

The battery charging and supervisory apparatus shown and described in this application is particularly useful in the charging and supervision of the local storage battery used for supplying the alarm system disclosed in copending application referred to.

In the type of closed circuit alarm system referred to, alarm and supervisory signals are transmitted automatically to a central office from outlying protected premises. It is common practice to provide a storage battery at the outlying premises and to keep the storage battery in charged condition by means of a rectifier energized from the commercial alternating current power supply which is ordinarily available locally at the protected premises. This avoids the expense of a separate battery charging circuit from the central office to the outlying storage battery. The outlying battery, in addition to supplying a continuous supervisory current to the local closed circuit alarm system, is available for the operation of facilities such as alarm gongs, water flow control valves, and the like at the protected premises notwithstanding power failure of the commercial alternating current supply. Such power failure may frequently accompany a fire and the storage battery must provide an independent and absolutely reliable source of energy for emergency use under such circumstances.

From the foregoing, it will be appreciated that the storage battery must be continuously maintained fully charged and in good condition at all times so that it will always be available in case of emergency. While the battery will be checked periodically in the course of routine inspections, it is desirable to provide, insofar as possible, a continuous check of the condition of the battery by means of the usual supervisory or trouble signal circuit which extends from the protected premises to the central office.

It is common practice to trickle charge the local storage battery at the outlying premises by means of a rectifier which delivers somewhat more charging current to the battery than is drawn by the local closed supervisory circuits. Unless the charging current exceeds the drain of the supervisory current at all times, then the battery will gradually discharge, possibly to a point where it will no longer meet emergency demand for local energy which may be placed upon the battery at any time. Moreover, this discharged condition may arise without causing the transmission of a trouble signal to the central office by the closed local supervisory circuit so that an attendant will be dispatched to the protected premises.

As a precautionary measure, it is common practice to provide a safe excess of charging current over supervisory current in order to assure that the battery will receive a sufficient trickle charging current at all times, including low line voltage conditions of the commercial alternating current supply. As a result, excessive charging current may ordinarily be delivered to the battery with normal alternating current line voltage so that deterioration of the positive plates occurs whereby the useful life of the battery is shortened and the battery necessarily requires frequent replacement.

It is therefore an object of the present invention to avoid overcharging of the battery while at the same time continuously maintaining it in fully charged condition.

A further object of the invention is to transmit a trouble signal to the central office whenever the battery becomes partially discharged, as evidenced by an increased charging current which is automatically delivered to the battery.

Still another object of the invention is to provide a cyclical charging effect wherein the charging current periodically varies through a range of values whereby some slight discharging action occurs automatically followed by a compensatory charging action. This provides a desirable slight activation or cycling of the battery as compared with a continuous trickle charging, thereby preventing the undesirable formation of lead sulphate on the negative plates.

A further object of the invention is the provision of means for causing a trouble signal to be transmitted to the central office in the event that the battery should develop an increased internal resistance, as in the case of a corroded terminal, a loose connection, or other circumstance such that the battery becomes effectively open-circuited and only the rectifier is available to energize the protective system.

Another object of the invention is to provide coordinated means for the simultaneous and combined supervision of the battery as to its condition of charge, its internal continuity and the availability of alternating current for energization of the charging rectifier, failure in any one of these three respects being arranged to cause the transmission of a trouble signal to the central office.

Various other objects, features and advantages of the invention will become apparent upon reading the following specification together with the accompanying drawings forming part hereof.

Referring to the drawings:

FIG. 1 is an electrical circuit diagram illustrating the connections from the battery charging and supervisory apparatus of the present invention to an automatic alarm transmitter, the transmitter being disclosed in greater detail in my copending application identified above.

FIG. 2 is a front elevational view showing a sectionalized mounting arrangement for two separate apparatus units, one of the units being a charging control unit comprising a saturable reactor and optionally an adjustable resistor for controlling the charging rate of the battery and the other unit comprising a transformer and rectifier, the transformer and rectifier unit being suitable for general use independently of the charging control unit.

FIG. 3 is a side elevation including the optional adjustable resistor.

FIG. 4 is a top plan view showing the charging control unit with the resistor omitted.

FIG. 5 is a bottom plan view.

Referring to FIG. 1, there is an automatic alarm transmitter designated generally as 100. The transmitter 100 is shown in detial in my copending application referred to above. Terminals T–1 to T–16 of the transmitter 100 are shown mounted on an apparatus panel 18 of insulating material. Spring driven fire clock and trouble clock code wheel transmitters 10 and 11 are mounted on panel 18 for transmitting alarm and trouble signals, respectively, to the central office. A closed supervisory circuit includes normally closed tamper switch contacts 20 which are associated with the door of an enclosure (not shown) in which the transmitter 100 is mounted.

The tamper contacts 20 cause a trouble signal to be transmitted to the central office by the spring driven trouble clock mechanism 11 when the enclosure door is opened. The contacts of certain battery supervisory relays, later to be described, are also included in the closed supervisory tamper circuit between transmitter terminals T-1 and T-2.

Terminals T-3 and T-4 are connected to the winding of an alarm relay 37 mounted on the panel 18. The alarm relay 37 causes the transmission of an alarm signal to the central office by the fire clock in the event that the conductors 45 and 46 of a closed loop alarm circuit are connected together by an alarm switch 47. This closed loop alarm circuit also serially includes the tamper circuit between terminals T-1 and T-2. Terminals T-4 and T-5 supply supervisory current to conductors 45 and 46 and tamper switch 20 so that the operating winding of the alarm relay 37 is normally maintained energized.

The alarm switch 47 is provided with normally open contacts which are connected between the loop conductors 45 and 46. In the event of fire or other condition requiring an alarm signal to be transmitted to the central office, the switch 47 closes its contacts and shuts off the current supply from terminals T-5 and T-6 to terminals T-1, T-2 and T-3, T-4, thereby deenergizing the alarm relay 37. The operating winding of a trouble relay 39 is included in the supervisory current supply circuit to terminals T-5 and T-6, however, and the trouble relay will remain energized in the event of an alarm. If the alarm relay remains deenergized for a certain time interval while the trouble relay remains energized, this time interval being determined by the discharge time of an electrolytic capacitor 36, then the spring driven fire clock mechanism 10 becomes operative to transmit an alarm signal to the central office. In the event of an open circuit condition or a ground on the loop circuit of conductors 45 and 46 or on the supervisory circuit of trouble switch 20, then the winding of the trouble relay 39 is deenergized. Whenever the winding of the trouble relay 39 is deenergized, the spring driven trouble clock code wheel mechanism 11 transmits a distinctive trouble signal to the central office. Direct current for operation of the transmitter 100 is supplied to its terminals T-7 and T-8, the terminal T-7 being of negative polarity. There is also a direct current supply supervisory relay 38 mounted on panel 18. In the event of failure of the direct current supply at terminals T-7 and T-8, the relay 38 releases causing the fire clock mechanism 10 to transmit a special power failure trouble signal to the central office, instead of an alarm signal.

Terminals T-9 and T-10 are permanently connected together within the transmitter 100 and are externally connected to ground, as shown. Terminals T-13 and T-14 are connected within transmitter 100 to a pair of contacts on the fire clock mechanism 10 which close whenever an alarm is transmitted to the central office by the fire clock mechanism 10. Terminals T-15 and T-16 are similarly connected to separate contacts of the fire clock mechanism 10, which are actuated when an alarm is transmitted to the central office and these contacts may conveniently be used to trip a city fire alarm box or other independent alarm facility.

Terminals T-13 and T-14 are shown connected to trip and operate a deluge system 105, for example, which completely floods the protected area almost immediately for extinguishing a fire in the minimum possible time. The deluge system will thus be operated whenever the fire clock mechanism 10 is tripped by whatever cause, including the release of its tripping magnet by total direct current failure at terminals T-7 and T-8 of transmitter 100.

To avoid false tripping of the deluge system 105 and similar false tripping of a city fire alarm box connected to terminals T-15 and T-16, it is essential that the local storage battery be maintained fully charged and in good condition at all times. For this reason, the charging and supervisory apparatus to be described below is of particular utility in a system of this type.

Terminals T-11 and T-12 are connected within the transmitter 100 to the code wheel actuated contacts of the spring-driven fire clock and trouble clock mechanisms 10 and 11. Terminals T-11 and T-12 are connected to line conductors 107 and 108 which extend to a central office (not shown).

Current for battery charging purposes is supplied to the apparatus of FIG. 1 by conductors 110 and 111 which are connected to a local source of commercial alternating current. The line conductor 110 is connected through a saturable reactor designated generally as 113 and a further conductor 114 to the primary winding 115 of a step down and insulating transformer designated generally as 116. The line voltage applied to conductors 110 and 111 is illustratively indicated as 118 volts 60 cycles, the actual voltage, of course, being subject to the usual commercial variations from its nominal value of 118 volts. Ordinarily, these variations may be of the order of plus or minus 5% or even more. The energizing circuit for the primary winding 115 is completed by conductor 111.

The saturable reactor 113 includes two serially connected load windings 118 and 119. The reactor has a magnetizable core comprising a central leg 121 which is flanked by outer or side legs 122 and 123. The load windings 118 and 119 are disposed on the outer legs 122 and 123, respectively, and there is a control winding 125 arranged on the central leg 121. The load windings are connected in bucking relationship so that if the central core leg 121 were removed, the mutual inductance of the windings would be substantially zero. With zero current in control winding 125, the central core leg 121 provides a magnetic path of low reluctance tending to decouple the load windings 118 and 119 from each other so that their coefficient of coupling is reduced and their respective individual inductances are additive. By passing a direct current through the control winding 125, however, the central core leg 121 becomes saturated to a certain extent. This saturation effect increases the coupling between the load windings 118 and 119 on the outer core legs 122 and 123 so that the bucking action of the windings 118 and 119 comes into play and their combined impedance decreases.

A rheostat 126 is included in the series connection between load windings 118 and 119 for adjusting the apparatus in accordance with the actual nominal voltage of the power line which supplies alternating current to conductors 110 and 111 at any particular installation.

The transformer 116 is provided with a secondary winding 128 which is connected directly to the alternating current input terminal 129 of a full-wave bridge-connected rectifier 130, preferably of the dry disc selenium type.

The negative output terminal 132 of the rectifier 130 is connected by a conductor 133 to a negative battery terminal 134. The conductor 133 also extends to the negative battery supply terminal T-7 of the automatic transmitter 100 described above and to one end of a transformer primary winding 150.

The positive output terminal 138 is connected by a conductor 139 to the control winding 125 of the saturable reactor 113. Conductor 140 connected with terminal 207 of the saturable reactor 113 extends to terminal T-8 of the transmitter 100 and also to capacitor 149 and winding 142 of relay 143. A connection 140a extends from the other side of this "low gravity" marginal relay 143 to the positive battery terminal 146.

A storage battery 148 of the lead-acid type is shown connected to the battery terminals 134 and 146. By way of illustration, the storage battery 148 is indicated as being a 12 volt or six-cell lead-acid battery of ten ampere-hours capacity.

The transformer 151 has a secondary winding 153 which is connected through a half-wave rectifier 154 to the operating winding 155 of a supervisory relay 157, the relay 157 being a sensitive relay used for indicating an open circuit condition of the battery 148. A shunt capacitor 275 is connected across the winding 155 of relay 157 to bypass A.C.

In place of operating a tamper circuit as described, the contacts 162 could be utilized to operate a signal light, local bell, or the like.

Also it is contemplated that supervisory relay 157, rectifier 154 and capacitor 275 might be omitted and the ripple output of transformer secondary 153 be utilized to operate a speaker, neon lamp, or other such indicating or signaling means.

There is another power failure supervisory relay 158 which has an operating winding 159, the operating winding 159 being connected directly across the main power supply line conductors 110 and 111.

The three supervisory relays 143, 157 and 158 are provided with normally closed contacts 161, 162 and 163, all serially connected in the common normally closed supervisory tamper circuit along with the door switch 20 by means of the circuit 165. The operating windings 142 and 155 of relays 143 and 157 do not normally receive sufficient current to open their associated contacts 161 and 162, respetcively. The relay winding 159 of relay 158 normally receives sufficient current to hold its associated contacts 163 closed. Accordingly, under normal operating conditions, continuity is maintained between terminals T-1 and T-2 of the automatic alarm transmitter 100 and in the event of any of the three supervisory relays 143, 157 or 158 assuming an abnormal position, this continuity will be interrupted. As described above, a trouble signal will then be transmitted to the central office by the trouble clock mechanism 11.

In operation, a continuous direct current of about 100 milliamperes is supplied to terminals T-7 and T-8 of the automatic transmitter 100. This current drain represents the steady constant load continuously imposed by the supervisory relays 37, 38 and 39 including the supervisory current in loop conductors 45 and 46 and tamper circuit 165 together with the continuous current drain of the tripping magnets of the fire clock and trouble clock mechanisms 10 and 11, respectively. Thus the constant load resistance between terminals T-7 and T-8 is about 120 ohms.

The saturable reactor 113 will vary its impedance from a maximum value of about 150 ohms with zero current flow in the control winding 125 to a minimum value of about 10 ohms with 500 milliamperes flowing in the control winding 125.

Within a certain critical range of line voltages on conductors 110 and 111, it has been observed in practice that the charging of battery 148 takes on a cyclic effect. Starting with the battery 148 fully charged to a potential of 13.6 volts, the rheostat 126 was adjusted to produce a battery potential of 13.1 volts. Thereafter, during twelve days of continuous operation, the battery potential was found to vary between 12.4 and 13.1 volts being so maintained by an automatic cyclic or self-oscillatory charging condition produced by interaction between the regulating characteristics of the saturable reactor 113 and the electrochemical characteristics of the battery 148. The output current delivered by the rectifier 130 varied from a maximum of 500 milliamperes with a battery voltage of 12.0 volts to a minimum of 200 milliamperes with a battery voltage of 13.6 volts, the rectifier output current including the continuous drain of 100–120 milliamperes imposed by the steady load connected to the battery-rectifier circuit.

When the battery 148 is about 25% discharged, whereby its maximum period of service in the event of commercial power failure is materially reduced, the charging current drawn by the battery alone and exclusive of the 100 milliamperes load will rise to about 500 milliamperes. This is considered to be a trouble condition requiring a special visit to the protected premises by maintenance personnel. The "low gravity" supervisory relay 143 is therefore adjusted to open its contacts 161 and cause the transmission of a trouble signal by the trouble clock mechanism 11 whenever the battery charging current flowing in its winding 142 exceeds about 500 milliamperes. The relay 143 is preferably a sensitive relay and the resistance of its winding 142 is accordingly sufficiently low to be negligible.

With the battery 148 disconnected, a ripple voltage of about 4.5 volts is present across the output terminals 132 and 138 of the rectifier 130. If the battery 148 is in good condition and is connected to the rectifier 130, as shown, this ripple voltage is attenuated by the low internal resistance of the battery 148 and thus becomes effectively zero. This ripple voltage is applied to the primary winding 150 of transformer 151 through the blocking capacitor 149. The ripple voltage is stepped up by transformer 151 and the increased voltage from secondary winding 153 is rectified by the half-wave rectifier 154 and used to energize the winding 155 of supervisory relay 157. The relay 157 is adjusted to open its contacts 162 whenever this ripple voltage rises sufficiently to indicate a high internal resistance or open circuit condition within the battery 148. Under such conditions, the relay contacts 162 open thereby causing the trouble clock mechanism to transmit a trouble signal to the central office because of the non-availability of the battery.

It should be noted that this condition of non-availability of the battery 148 will not be detected by the power failure relay 38 or the trouble supervisory relay 39 of transmitter 100 because the rectifier 130 continues to supply the load. Accordingly, if the battery 148 should be unavailable, then, in case of power failure of the commercial alternating current, even momentarily, at conductors 110 and 111, the tripping magnets of the spring-driven fire clock and trouble clock mechanisms 10 and 11 would both release simultaneously and cause both clock mechanisms to operate. While this condition releases relay 38 and causes a special power failure signal to be transmitted to the central office, the accompanying operation of the fire clock mechanism 10 will nevertheless actuate its local contacts to trip the deluge system 105 and also trip a city fire alarm box, if any, connected to terminals T-15 and T-16. It is therefore essential to provide, insofar as possible, continuous and complete supervision of the battery 148 to assure that it is always available for service in the event of failure of the local commercial alternating current supply. In certain installations, there may be emergency apparatus which is actuated by operation of the fire clock mechanism 10 and which is energized by the local battery 148. Whenever the electrical load temporarily imposed by such apparatus exceeds the capacity of the rectifier 130, then it is absolutely essential that the battery 148 be in good condition and available at all times to assure positive and reliable operation of such emergency apparatus.

As a further supervisory measure, the winding 159 of supervisory relay 158 is continuously energized from the alternating current supply conductors 110 and 111. In the event of power failure of the local alternating current supply, whereby the rectifier 130 becomes deenergized and ceases to charge the battery, then the contacts 163 of relay 158 open. This opens the supervisory circuit between terminals T-1 and T-2, thereby causing the trouble clock mechanism 11 to transmit a trouble signal to the central office.

Referring to FIGS. 2 to 5, a sectionalized mounting structure is shown which is used for mounting the charging control and rectifier apparatus described above. The adjustable resistor 126 is optional and is included in FIG. 3, being omitted from FIGS. 2, 4 and 5 for simplicity of illustration.

The mounting structure comprises a pair of symmetrical and generally right triangular end members 167 and 168. The end member 167 is provided with an inwardly directed horizontal base flange portion 169 and an inwardly directed upright rear flange portion 170. The base flange portion 169 has a mounting hole 172 formed therein for bolting the flange 169 to the floor of an enclosing cabinet (not shown) or for otherwise securing the apparatus in a desired position. The other end member 168 is similarly provided with base and rear flanges 173 and 174, respectively, a mounting pole 172 being provided in the base flange 173 like the mounting hole 172 in the base flange 169. The flange portions 169 and 170 are directed toward the flange portions 173 and 174, respectively, and vice versa.

The saturable reactor 113 and its regulating rheostat 126 (unless rheostat 126 is omitted) are mounted in an upper apparatus unit 177. The transformer 116 and full wave rectifier 130 are mounted in a lower apparatus unit 178. The upper unit 177 comprises a front mounting plate 180 bent to provide a vertical front panel portion 181 with integrally formed side leg portions 182 and outwardly bent feet 183. A rear enclosing plate 185 is secured to the feet 183 of the front mounting plate 180 by rivets 186. The lower unit 178 similarly comprises a front mounting plate 187 and a rear enclosing plate 188.

The saturable reactor 113 is mounted on one of the leg portions 182 of the front mounting plate 180 by bolts 190. The rheostat 126, when provided, is mounted on the other leg portion 182 of the front mounting plate 180 by conventional single hole mounting structure not visible in the drawing. A knob 191 which is accessible at the right hand side of the upper unit 177 is provided for adjusting the rheostat 126.

In the lower unit 178, the transformer 116 is bolted to one of the leg portions of the front mounting plate 187 and the rectifier 130 is secured to the other leg portion of the mounting plate 187 by a nut 193. The nut 193 is threaded on an extending portion of a bolt 194 which holds the elements 195 of rectifier 130 assembled in stacked relationship. The upper and lower units 177 and 178 are secured to the upright rear flange portions 170 and 174 of end members 167 and 168 by bolts 197.

Two terminal blocks 198 and 199 are mounted on the front of the upper unit 177 by means of screws 200. Two similar terminal blocks 201 and 202 are mounted on the front of the lower unit 178 by screws 203.

The terminal block 198 is provided with two screw-type terminals 205 and 206 for high voltage which are connected within the upper unit 177 to the loading windings 118 and 119 of the saturable reactor 113. The terminal block 199 is similarly provided with screw-type terminals 207 and 208 for low voltage, these terminals being internally connected within the upper unit 177 to the control winding 125 of the saturable reactor 113.

The terminal block 201 of the lower unit 178 is provided with screw-type terminals 209 and 210 for high voltage these terminals being internally connected within the lower unit 178 to the primary winding 115 of stepdown transformer 116. The low voltage positive and negative terminals 138 and 132, respectively, of the rectifier 130, referred to above, appear in FIGS. 2 to 5 as screw-type terminals forming a part of the terminal block 202.

The upper and lower units 177 and 178 are provided with nameplates 211 and 212, respectively, for purposes of terminal identification and for the provision of instructions and information relating to the operating characteristics of the two units. When the lower or rectifier unit 178 is used alone, without the upper reactor unit 177, then end members similar to the end members 167 and 168 may be provided, except that the end members for a single unit will be of shorter height than those illustrated for two units.

From the foregoing, it will be seen that I provide self-regulating means for delivering a charging current to the battery which varies in accordance with the condition of charge of the battery as reflected by its terminal voltage. The charging current is automatically minimized when the battery is fully charged and has a maximum value when the battery is fully discharged for rapidly bringing the battery back to a fully charged and serviceable condition.

Additionally, the saturable reactor 113 establishes a cyclical or oscillatory charging and discharging effect whereby the condition of the battery varies slowly from a fully charged condition to a slightly discharged condition. This slow self-oscillating action provides desirable electrochemical activation for the battery plates, as compared with the continuous destructive action of a trickle charge which constantly builds up an excess of red oxide of lead at the positive plates of the battery.

Furthermore, I advantageously provide a supervisory indication of a discharged condition of the battery which automatically results in a charging rate higher than normal and a non-available condition of the battery caused by high internal resistance or an open circuit condition within the battery.

It will also be seen that I provide a simple and highly adaptable mounting structure for the rectifier and reactor units, the rectifier unit 178 being so arranged that it may easily be mounted for use either with or without the saturable reactor regulator unit.

Whether mounted alone or with the saturable reactor unit, the high voltage and low voltage terminals of the the rectifier unit 178 are widely separated for avoiding any danger of accidental interconnection between the power supply circuits and the low voltage signaling circuits. The same condition prevails when the two units are mounted together as shown in FIG. 2. All of the high voltage connections are at the left hand side of the double unit and all of the low voltage connections are at the right hand side.

It will be apparent to those skilled in the art that many changes and modifications may be made in the preferred embodiments of the invention which are herein disclosed without departing from the spirit and scope of the invention as defined in the claims.

What is claimed is:

1. Battery charging apparatus for charging a storage battery, said apparatus comprising in combination, rectifying means including an output circuit for delivering a unidirectional charging current to said battery, said charging current including a ripple component which is attenuated by the internal resistance of said battery, and an input circuit for energizing said rectifying means from a source of alternating current, a saturable reactor having a load winding connected in said input circuit and a control winding connected in said output circuit, the impedance of said load winding decreasing with increased current flow through said control winding, charging current responsive means included in said output circuit, said charging current responsive means being actuated by an increased charging current flowing into said battery from said rectifying means when said battery is in an appreciably discharged condition, terminal means included in said output circuit and adapted for connection to said battery, ripple current responsive means connected to said terminal means, said ripple current responsive means being actuated by an increase in the internal resistance of said battery, and signaling circuit common to both of said current responsive means, said signaling circuit being responsive both to a marked discharge of said battery and to an increase in the internal resistance thereof.

2. Apparatus according to claim 1, further comprising trouble signal means connected to said signaling circuit for response to actuation of either of said current responsive means.

3. Apparatus according to claim 2, and in which said trouble signal means includes means adapted to transmit a trouble signal to a remote location.

4. Battery charging apparatus for charging a storage battery, said apparatus comprising in combination, rectifying means including an output circuit for delivering a unidirectional charging current to said battery and an input circuit for energizing said rectifying means from a source of alternating current, ripple voltage responsive means connected to said rectifying means, said ripple voltage responsive means being actuated by the ripple voltage in said output circuit accompanying an abnormal increase in internal resistance of said battery, trouble signal means connected for response to actuation of said ripple voltage responsive means, said ripple voltage responsive means including a transformer having a primary winding connected to said rectifying means, blocking means connected between said primary winding and said rectifying means for preventing the flow of direct current through said primary winding, a secondary winding coupled to said primary winding, and relay means connected to said secondary winding for actuation by said ripple voltage.

5. Apparatus according to claim 4, wherein said blocking means is a capacitor connected in series with said primary winding.

6. A direct current alarm system comprising, in combination, a lead-acid storage battery, a full-wave dry disc selenium rectifier, said rectifier having an input and an output, said output being connected to said battery, a transformer having primary and secondary windings, said secondary winding being connected directly to said rectifier input, an energizing circuit for said primary winding, a saturable reactor having a control winding and a load winding, said control winding being serially included in the connection between said battery and said rectifier output, said load winding being serially included in said energizing circuit, rheostat means serially included in said energizing circuit for adjusting the current flow in said primary winding, and an alarm circuit of constant resistance connected to said battery for continuous energization therefrom, said saturable reactor being dimensioned to produce a cyclically varying charging current to be delivered to said battery by said rectifier.

7. Battery charging apparatus for charging a storage battery, said apparatus comprising in combination, rectifying means including an output circuit adapted for connection to the battery to be charged, an alternating current energizing circuit for said rectifying means, a series combination of a capacitor and an electromagnetic winding connected to said output circuit, said winding being energized by ripple current from said output circuit when said output circuit becomes disconnected from said battery.

8. Apparatus according to claim 7, further comprising trouble signal means responsive to energization of said winding by said ripple current.

9. Apparatus according to claim 8, wherein said trouble signal means includes means adapted to transmit a trouble signal to a remote location.

10. Apparatus according to claim 7, further comprising a secondary winding magnetically coupled to said first-named winding and trouble signal means connected for energization by said secondary winding.

References Cited in the file of this patent

UNITED STATES PATENTS

| | | |
|---|---|---|
| 2,055,285 | Ford | Sept. 22, 1936 |
| 2,068,188 | Logan | Jan. 19, 1937 |
| 2,085,061 | Aggers | June 29, 1937 |
| 2,177,556 | Walker | Oct. 24, 1939 |
| 2,373,383 | Christopher | Apr. 10, 1945 |
| 2,431,311 | Cronvall | Nov. 25, 1947 |
| 2,431,312 | Cronvall | Nov. 25, 1947 |
| 2,571,048 | Medlar | Oct. 9, 1951 |
| 2,674,713 | Sargeant | Apr. 6, 1954 |
| 2,721,993 | Medlar | Oct. 25, 1955 |
| 2,733,402 | Bixby | Jan. 31, 1956 |
| 2,753,510 | Smith | July 3, 1956 |
| 2,789,042 | Kinney | Apr. 16, 1957 |
| 2,802,166 | Sanderlin et al. | Aug. 6, 1957 |